US012784005B2

(12) United States Patent
Bobbala et al.

(10) Patent No.: US 12,784,005 B2
(45) Date of Patent: Nov. 3, 2026

(54) TASK SCHEDULER FOR SCHEDULING RECURRING TASKS

(71) Applicant: Hexagon Technology Center GmbH, Heerbrugg (CH)

(72) Inventors: Pradeep Reddy Bobbala, R. R. Dist (IN); Tejaswini Panjakadi, Secunderabad (IN)

(73) Assignee: Hexagon Technology Center GmbH, Heerbrugg (CH)

(*) Notice: Subject to any disclaimer, the term of this patent is extended or adjusted under 35 U.S.C. 154(b) by 22 days.

(21) Appl. No.: 17/348,647

(22) Filed: Jun. 15, 2021

(65) Prior Publication Data

US 2021/0390516 A1 Dec. 16, 2021

(30) Foreign Application Priority Data

Jun. 15, 2020 (IN) ............................ 202041025139

(51) Int. Cl.

| | |
|---|---|
| ***G06Q 10/109*** | (2023.01) |
| ***G06F 3/0482*** | (2013.01) |
| ***G06F 9/451*** | (2018.01) |

(52) U.S. Cl.

CPC ....... *G06Q 10/1097* (2013.01); *G06F 3/0482* (2013.01); *G06F 9/451* (2018.02)

(58) Field of Classification Search

CPC ... G06Q 10/1097; G06F 3/0482; G06F 9/451; G06F 3/0481; G06F 3/04847

See application file for complete search history.

(56) References Cited

U.S. PATENT DOCUMENTS

| | | | | |
|---|---|---|---|---|
| 5,896,491 A * | 4/1999 | Englefield | G06F 3/04892 | 715/781 |
| 6,359,840 B1 * | 3/2002 | Evans | G04C 3/14 | 368/80 |
| 7,451,098 B2 * | 11/2008 | Ingman | G06Q 10/1093 | 705/7.14 |
| 2003/0131098 A1 * | 7/2003 | Huntington | H04L 69/164 | 709/224 |
| 2007/0147178 A1 * | 6/2007 | Masuda | G06F 3/0481 | 368/29 |
| 2007/0180392 A1 * | 8/2007 | Russo | G06F 3/04883 | 715/810 |

(Continued)

*Primary Examiner* — Cesar B Paula
*Assistant Examiner* — David Tan
(74) *Attorney, Agent, or Firm* — Nutter McClennen & Fish LLP

(57) ABSTRACT

A method of scheduling recurring tasks using an electronic device comprises, receiving a user request to schedule a recurring task. The method further comprises rendering a GUI including a plurality of regions presented concurrently in a first view. The plurality of regions includes a month selection region displaying all months of a calendar year, a date selection region displaying all dates of a month, a day selection region displaying all days of a week, a time selection region displaying a plurality of hours of a day and a plurality of minutes of an hour. The method further includes, receiving, inputs that specify selection of one or more cells in one or more of the plurality of regions of the GUI to define a schedule for the recurring task. Furthermore, the method includes, executing, an application at a time corresponding to the schedule for the recurring task.

22 Claims, 16 Drawing Sheets

(56) References Cited

U.S. PATENT DOCUMENTS

| | | | | |
|---|---|---|---|---|
| 2009/0170492 | A1* | 7/2009 | Lee | H04M 1/72451 455/418 |
| 2012/0204112 | A1* | 8/2012 | Levine | G06Q 10/109 715/733 |
| 2014/0082536 | A1* | 3/2014 | Costa | G06F 3/04847 715/765 |
| 2014/0157177 | A1* | 6/2014 | Ghadge | G06Q 10/109 715/772 |
| 2014/0219066 | A1* | 8/2014 | Sadilek | G06F 3/04886 368/82 |
| 2014/0288989 | A1* | 9/2014 | Goeppinger | G06Q 10/06314 705/7.19 |
| 2014/0310045 | A1* | 10/2014 | Meltzer | G06Q 10/1095 705/7.19 |
| 2015/0205509 | A1* | 7/2015 | Scriven | G06Q 10/109 715/834 |
| 2015/0370469 | A1* | 12/2015 | Leong | G06F 3/0482 715/771 |
| 2018/0357305 | A1* | 12/2018 | Kinast | G06F 16/338 |

* cited by examiner

700

800

900

1000

1100

1200

1300

TASK SCHEDULER FOR SCHEDULING RECURRING TASKS

CROSS REFERENCE TO RELATED APPLICATIONS

The present application claims priority to Indian Patent Application No. 202041025139, filed on Jun. 15, 2020, the content of which is incorporated by reference herein in its entirety.

FIELD OF THE INVENTION

The present disclosure relates to a task scheduler and, more particularly, the present disclosure relates to a task scheduler for scheduling recurring tasks.

BACKGROUND

Individuals working in enterprises, or otherwise, make use of several applications for managing and performing their day-to-day work. Examples of such applications include but are not limited to work management applications, database managers, email clients, and calendars. An individual may run these applications on computing devices, such as laptops, desktops, smart phones etc.

In instances where a particular task is to be repeatedly performed or performed at a later point in time, the individual typically tends to schedule a reminder for such tasks. More particularly, a scheduled event may be created by the individual to remind himself or any other concerned person about the task. To this end, the individual explores or uses the option of a scheduler associated or integrated with the application.

For creating these scheduled events for being reminded about the tasks, there exists several different schedulers having different types of user interfaces. However, such interfaces are limited in that they do not provide full functionality. For instance, in some applications such as email clients, the scheduler provides for only limited possible combinations of scheduling recurring jobs. Additionally, existing schedulers may require substantial screen space and multiple user interface windows in order to schedule an event.

SUMMARY

This summary is provided to introduce a selection of concepts, in a simplified format, that are further described in the detailed description of the present disclosure. This summary is neither intended to identify key or essential inventive concepts nor is it intended for determining the scope of the present disclosure.

In an embodiment, a method of scheduling recurring tasks using an electronic device is disclosed. The method comprises, receiving a user request from a user to schedule a recurring task. The method further comprises rendering a GUI in response to the receiving of the user request, the GUI including a plurality of regions presented concurrently in a first view of the GUI. The plurality of regions includes a month selection region displaying all months of a calendar year, each of the months an independently selectable month cell, a date selection region displaying all dates of a month, each of the dates an independently selectable date cell, a day selection region displaying all days of a week, each of the days an independently selectable weekday cell, a time selection region displaying a plurality of hours of a day and a plurality of minutes of an hour, each of the hours an independently selectable hour cell, each of the minutes an independently selectable minute cell. The method further includes, receiving, one or more schedule selection inputs from the user that specify a selection of one or more cells in one or more of the plurality of regions of the GUI, the selection of one or more cells defining a schedule for the recurring task. Furthermore, the method includes, executing, an application in the electronic device at a time corresponding to the schedule for the recurring task.

In another embodiment, a system comprising a processor, memory, and a scheduler, configured to perform the above method is disclosed. In yet another embodiment, a non-transitory medium comprising instructions executable by a processor to perform the aforementioned method is disclosed.

According to aspects of the present subject matter, the UI and the scheduler provides for the following:

- Can build all combinations of schedules possible by Cron expressions.
- Allows selecting specific month(s) or every month.
- Allows selecting specific day(s) of month or every day, using intuitive calendar grid.
- Allows selecting specific day(s) of week or every day.
- Allows selecting specific hour(s) or every hour.
- Allows selecting specific minute(s) of an hour.
- Allows selecting time in both 12-hour and 24-hour format.
- Allows selecting last day of the month.
- Allows selecting specific number of days before last day of the month.
- Allows selecting last weekday (Monday to Friday) of the month.
- Allows selecting specific day of the specific week.
- Allows selecting nearest weekday (Monday to Friday) to specific day of the month.
- Description is displayed for selected schedule as per a pre-selected language.

To further clarify the advantages and features of the present disclosure, a more particular description will be rendered by reference to specific embodiments thereof, which is illustrated in the appended drawings. It is appreciated that these drawings depict only typical embodiments of the present disclosure and are therefore not to be considered limiting of its scope. The presently disclosed embodiments will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
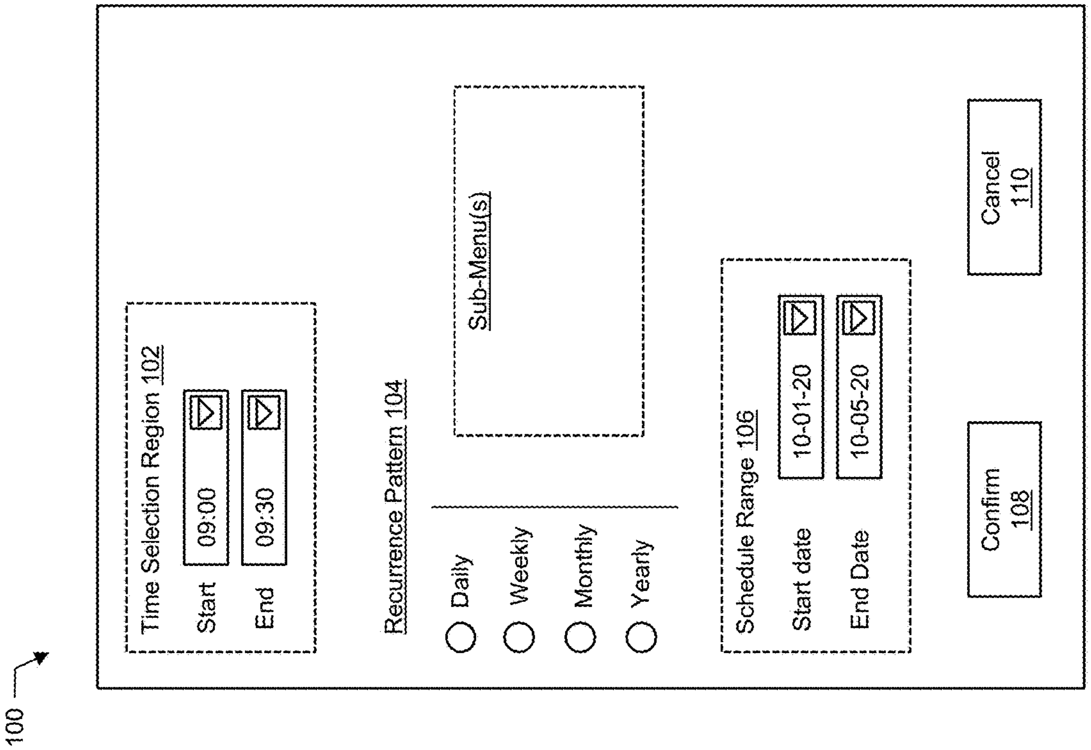
FIG. 1 (Prior Art)
FIG. 1 illustrates an example Graphical User Interface (GUI) 100 of a task scheduler for setting recurring tasks, according to a conventional solution.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION OF FIGURES

For the purpose of promoting an understanding of the principles of the embodiments of the present disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the embodiments as illustrated therein being contemplated as would normally occur to one skilled in the art to which the embodiments relate. Unless otherwise defined, all technical and scientific terms used herein have the same meaning as commonly understood by one of ordinary skilled in the art to which the embodiments of the present disclosure belong. The system, methods, and examples provided herein are illustrative only and not intended to be limiting.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skills in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Embodiments of the present disclosure will be described below in detail with reference to the accompanying drawings.

Electronic devices, such as, for example, desktops, laptops, personal digital assistants, and smartphones, have greatly impacted the lives of users in the past few decades. With the advancement in technology, these electronic devices have helped us in digitizing many of our tasks.

In addition to performing the tasks, these electronic devices also help users to place reminders or create tasks that can be executed at a specific point in time which is defined by the user. These aforementioned actions are often implemented using task scheduler applications. In addition to helping create and execute a task at a specific point in time, these task schedulers also help users in creating recurring tasks. For creation of these recurring tasks, a user is required to specify various details, such as, for example, time period, recurrence pattern, start date and end date, etc., which ultimately define the recurring task.

FIG. 1 illustrates an example of a prior art Graphical User Interface (GUI) 100 of a task scheduler for setting recurring tasks, according to a conventional solution. As can be seen, the GUI 100 includes a time selection region 102, a recurrence pattern 104, a schedule range 106, a confirm button 108, and a cancel button 110. In an example, the time selection region 102 may include a start option and an end option to define the start time and the end time, respectively. Using these options, the user may specify a time period related to a recurring task which the user intends to set. As can be seen, a drop down menu button is also provided with which the user can subsequently select the start and stop times for the task.

Owing to size limitations, the times may be provided in a scrollable list whereby the user scrolls through the list to arrive at the desired hour and minute. Additionally, the listings of the hours and minutes are at predefined time gaps. For instance, the listings may be half an hour apart and contain entries, such as 7 AM, 7 30 AM, 8 AM, 8 30 AM, 9 AM, 9 30 AM, and so on. This predefined gap between the entries limits the flexibility with which the user can select the hour and minute at which the user intends to initiate the task. For instance, if the user wants the task to initiate at 8 15 AM, the user may not be able to directly select this time. Instead, the user would need to select the dialog box and edit the time entry to make it 8 15. This, as may be understood, can be a cumbersome exercise for the user who is setting the recurring task.

Furthermore, the recurrence pattern region 104 provides the user with the option to select the recurrence style of the task. That is, the user can select the task to be initiated daily, weekly, monthly, or yearly. Accordingly, on selection of a particular recurrence style corresponding sub-menu is provided from which the user can further fine tune the recurrence style. For example, in case of selection of Daily option, the user may be provided with an option in the sub-menu to choose to perform the task every day. In other options, the user may be provided with option to have the task initiated monthly on a select day, or on a select date.

However, the options provided to select these days are limited or set at predefined gaps. As explained above, these predefined gaps do not provide the user with the flexibility of setting the task in a recurring fashion. Said style of selecting the recurring pattern is limited in that the user cannot dynamically select the days on which the user wants the task to initiate. To better illustrate this, consider an example where the user may intend to set the task to initiate on 1st, 4th, 7th, 11th, 17th, 23rd day of a given month. Now, currently available solutions are limited in providing with the user with such an option, and the user may be required to set the task schedules separately.

Thus, conventional task schedulers provide for limited flexibility and cumbersome mechanism to set recurring tasks.

Figure 2:
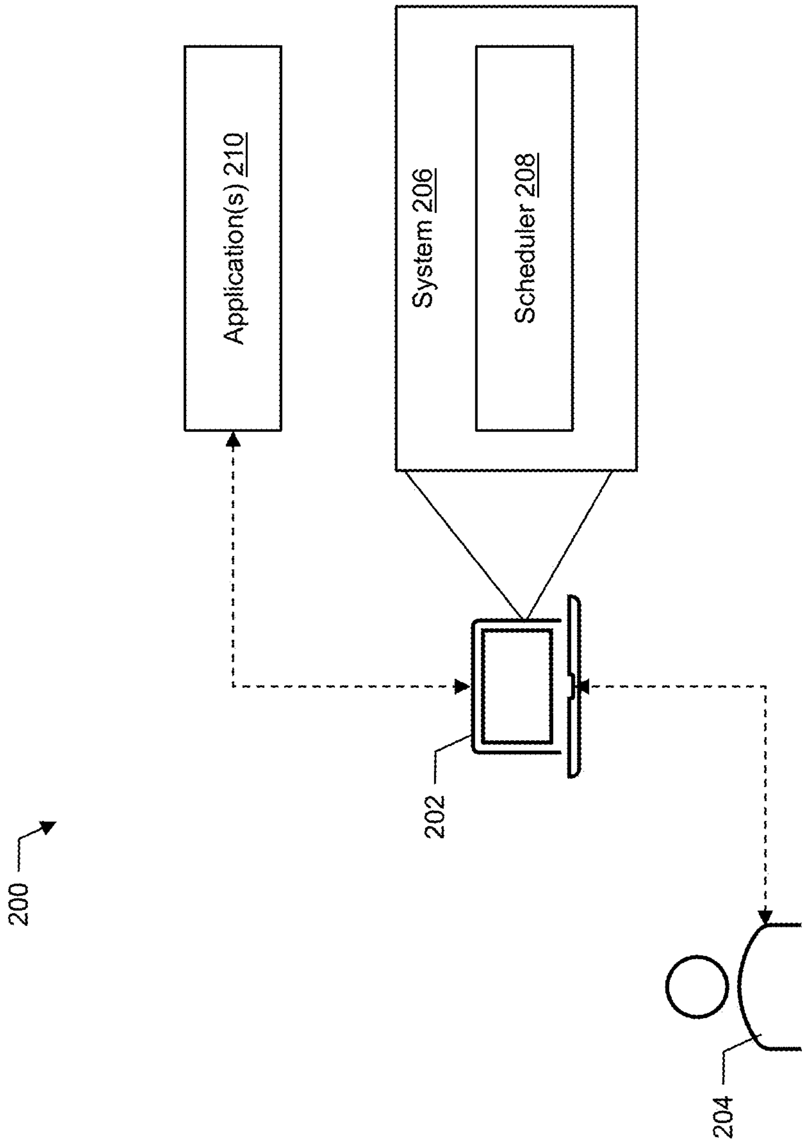
FIG. 2 illustrates an environment implementing a system implementing a scheduler, according to an example embodiment of the present subject matter.

FIG. 2 illustrates an environment 200, according to an example embodiment of the present subject matter. In an example, the environment 200 may include an electronic device 202, such as, for example, a laptop, a desktop, a smartphone, and a tablet, that may be operated by a user 204 for setting a recurring task. To that end, the electronic device 202 may include a system 206. The system 206 includes a scheduler 208 that is configured to set the recurring task based on user inputs received by the electronic device 202.

In an example, the electronic device 202 may further include applications 210, such as, for example, email application, antivirus application, cloud applications, task managers, project trackers, backup applications, and access permission management applications. The applications 210 may include one or more applications for which the user may set the recurring task. For example, consider a case where the application 210 is an application that creates a backup of emails. Accordingly, the user may seek to set a schedule for a recurring task for automatically creating the backup emails on desired dates. In an example embodiment, the applications 210 may be hosted on a remote server or a cloud server. In other example embodiments, some of the applications 210 may be stored on the electronic device 202 and some of the applications 210 may be stored on the remote server or the cloud server. In all the embodiments, the system 206 may be configured to set the recurring task for the applications 210, or for other applications that may invoke the applications 210.

In an example embodiment, the scheduler 208 may be configured to receive a user request from the user 204 to schedule a recurring task. In response thereto, the scheduler 208 may be configured to render a GUI on a display screen of the electronic device 202. In accordance with aspects of the present subject matter, the GUI may include a plurality of regions that may be presented concurrently in a first view of the GUI. Using the plurality of regions that are displayed in the first view, the user 204 may set the recurring task.

The plurality of regions, in an example embodiment, may include a month selection region, a date selection region, a day selection region, and a time selection region. In an example, the month selection region may be understood as a section of the GUI that displays all months of a calendar year as individual independently selectable month cells. In an example, the date selection region may be understood as section of the GUI that displays all dates of a month as individual independently selectable date cells. In an example, the day selection region may be understood as section of the GUI that displays all days of a week as individual independently selectable weekday cells. In an example, the time selection region may be understood as section of the GUI that displays a plurality of hours of a day and a plurality of minutes of an hour. Each of the hours may be an independently selectable hour cell and each of the minutes may be an independently selectable minute cell.

Subsequent to the displaying, the user 204 may provide one or more schedule selections inputs. In an example, the schedule selection inputs may be received by the scheduler 208. In an example embodiment, the schedule selection inputs specify a selection of one or more cells in one or more of the plurality of regions of the GUI. The selection of the one or more cells defines the schedule for the recurring task. In accordance with the present subject matter, as the user 204 is provided with the various regions in their entirety in the single view, the setting of the schedule for the recurring task becomes easier for the user. For instance, as the complete hours and minutes are displayed in entirety, i.e., the entire range thereof being displayed without the use of drop-down menus or other such expansion mechanisms, the user can visually see all the options and accordingly, select the cells for defining the desired schedule for the recurring task. Furthermore, the user is not limited by the fixed predetermined ranges and may select any of the dates in the month for setting the schedule in the same schedule. This provides for further flexibility for setting the recurring task to the user.

Once the schedule selection input is received, the scheduler 208 may be configured to set the schedule for the recurring task. Furthermore, through other separate inputs, the user may also assign an application that is to be launched as per the schedule. Accordingly, the scheduler 208 may be configured to execute the application in the electronic device 202 at a time corresponding to the schedule for the recurring task.

Figure 3:
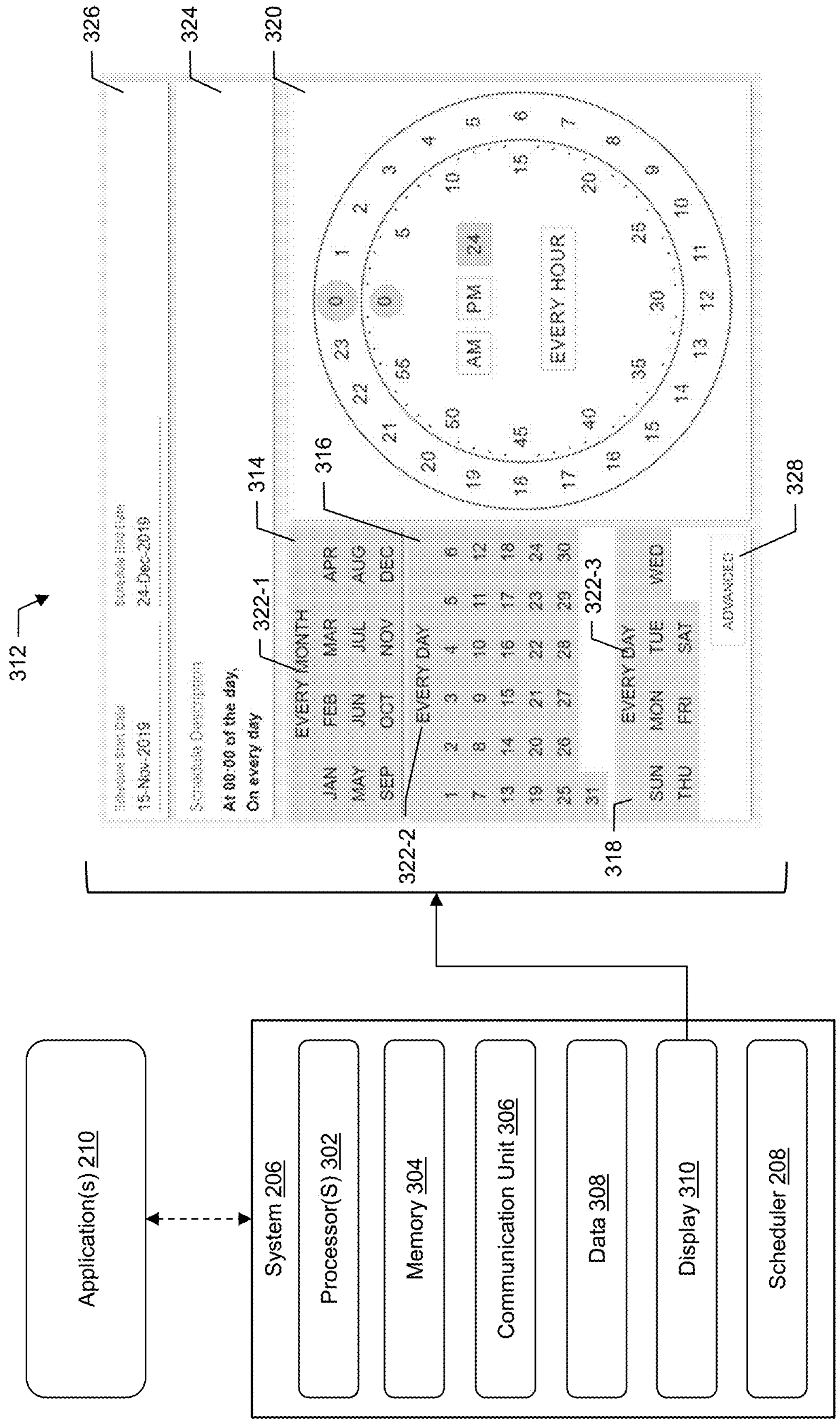
FIG. 3 illustrates a schematic block diagram of the system implementing the scheduler, according to an example embodiment of the present subject matter.

FIG. 3 illustrates a schematic block diagram of the system 206, according to an example embodiment of the present subject matter.

In an example embodiment, the system 206 may include a processor 302, memory 304, a communication unit 306, data 308, a display 310, and the scheduler 208. In an example, the memory 304, the communication unit 306, the display 310, and the scheduler 208 may be operably coupled to the processor 302.

In an example, the processor 302 may be a single processing unit or a number of units with multiple computing units. The processor 302 may be implemented as one or more microprocessors, microcomputers, microcontrollers, digital signal processors, central processing units, state machines, logic circuitries, and/or any devices that manipulate signals based on operational instructions. Among other capabilities, the processor 302 is configured to fetch and execute computer-readable instructions and data stored in the memory 304.

The memory 304 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The communication unit 306 may include at least one hardware unit that is configured to support communication between the electronic device 202 and external devices, for example, a server or other electronic devices 202. Accordingly, to that end, the communication unit 306 may be configured to implement or support at least one wired/wireless technology.

The data 308 serves, amongst other things, as a repository for storing data processed, received, and generated by one or more of the processor 302 and the scheduler 208. In some cases, data 308 may refer to a database. Data 308 may be an organized collection of data. For example, data 308 may store data in a specified format known as a schema. The data 308 may be structured as a single database, a distributed database, multiple distributed databases, or an emergency backup database. In some cases, a database controller may manage data storage and processing of data 308. In some cases, a user interacts with database controller. In other cases, database controller may operate automatically without user interaction.

The display 310 may include any type of display screen capable of rendering user interfaces. Examples of the display 310 may include a Liquid Crystal Display (LCD), a Light-Emitting Diode (LED) display, an Organic Light-Emitting Diode (OLED) display, a MicroElectroMechanical Systems (MEMS) display, and an electronic paper display.

The scheduler 208, amongst other things, include routines, programs, objects, components, data structures, etc., which perform particular tasks or implement data types. The scheduler 208 may also be implemented as signal processor(s), state machine(s), logic circuitries, and/or any other device or component that manipulate signals based on operational instructions. Furthermore, the scheduler 208 may be implemented in hardware, instructions executed by a processing unit, or by a combination thereof. The processing unit can comprise a computer, a processor, such as the processor 302, a state machine, a logic array, or any other suitable devices capable of processing instructions. The processing unit can be a general-purpose processor that executes instructions to cause the general-purpose processor to perform tasks or the processing unit can be dedicated to performing functions. In another aspect of the present subject matter, the scheduler 208 may be machine-readable instructions (software), which, when executed by a processor/processing unit, performs any of the described functionalities.

In an example, the user 204 may seek to set a recurring task associated with the application 210. In an example, the task may cause the application 210 to be launched and perform specified function(s). In another example, the task may cause the application 210 to launch another application and to perform tasks using the said other application. In an example, the task may simply be a reminder to an event or an appointment. In other examples, the application 210 may already be running and the task may cause the performing of the specified functions.

In an example embodiment, the scheduler 208 may be configured to receive a user request from the user 204 to schedule a recurring task. In an example, the application 210 may include a button for setting up recurring tasks, and on selection thereof by the user, the scheduler 208 may receive the user request. The button, in an example, may be provided in a task scheduler that may be integrated into the application 210 or coupled thereto. In one example, the application 210 itself may be a task scheduler with which other applications may be coupled.

Accordingly, recurring tasks for these other applications may be set using the application 210.

On receiving the user request, the scheduler 208 may be configured to render a GUI, such as, for example, a GUI 312 as shown in the figure. In an example, the scheduler 208 may render the GUI 312 using the display 310. In an example, the GUI 312 may include a plurality of regions that are presented concurrently in a first view of the GUI. In an example, the first view may be any view in which the plurality of regions is being displayed concurrently. In an example, the GUI 312 shown in the figure may be the first view of the GUI 312. According to an example embodiment, the plurality of regions may include a month selection region 314, a date selection region 316 from which any day of the month may be selected, a day selection region 318, and a time selection region 320.

In an example, the month selection region 314 may display all months of a calendar year. Herein each of the months may be displayed as an independently selectable month cell. In an example, the date selection region 316 may display all dates of a month. Herein each of the dates may be displayed as an independently selectable date cell. In an example, the day selection region 318 may display all days of a week. Herein each of the days may be displayed as an independently selectable weekday cell. In an example, the time selection region 320 may display a plurality of hours of a day (outer circle) and a plurality of minutes of an hour (inner circle). Herein each of the hours is displayed as an independently selectable hour cell and each of the minutes is displayed as an independently selectable minute cell. Here, “independently selectable” may mean that a cell can be selected (or de-selected) without changing the state of other like cells. For example, the date selection region 316 can begin with no date cells being selected. Thereafter, a user can select the ‘1’ date cell, followed by selection of the ‘2’ date cell without changing the state of the ‘1’ date cell or other such numbered date cells.

In an example embodiment, the date selection region 316, the day selection region 318, and the month selection region 314 may be displayed non-obtrusively with respect to each other in one of a vertically and horizontal alignment, in the first view of the GUI.

In an example, in the time selection region 320, a region in which the plurality of minute cells is displayed may be referred to as a “minute selection region”. In the minute selection region, one or more minute cells that are more frequently used may have a selectable area that is greater than a selectable area of other minute cells present in the plurality of minute cells. For example, minute cells corresponding to $5^{th}$, $10^{th}$, $15^{th}$, . . . $55^{th}$ minute may have greater selectable area than other minute cells.

In an example embodiment, a length of the time selection region 320 is equal to a sum of lengths of the date selection region 316, the day selection region 318, and the month selection region 314. Furthermore, in an example, embodiment, the date selection region 316, the day selection region 318, and the month selection region 314 have same breadth.

Figure 14:
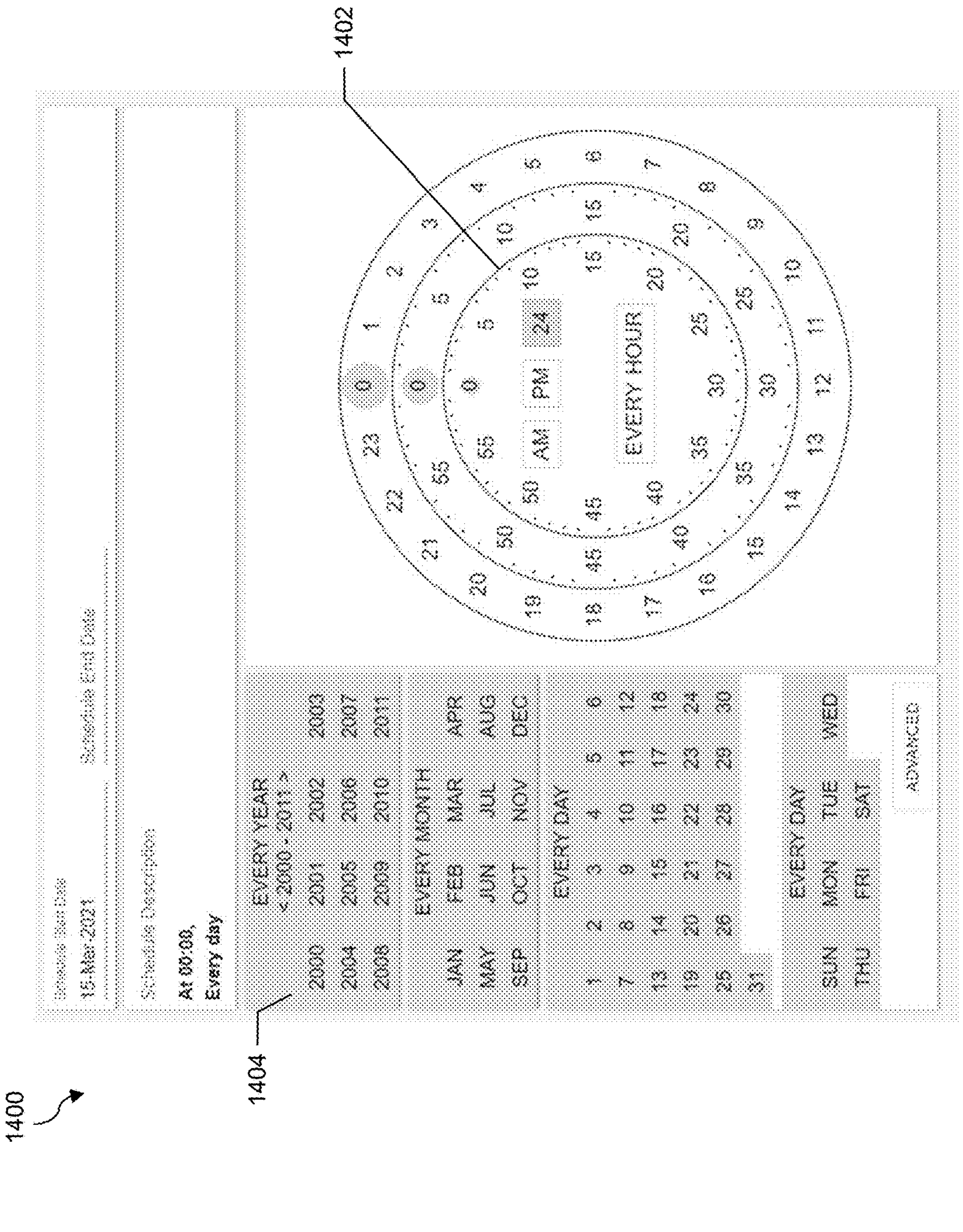
FIG. 14 illustrates another use case according to example embodiments of the present subject matter.

In an example embodiment, the GUI 312 may further include a second selection region (shown in FIG. 14) and a year selection region (shown in FIG. 14). In an example, the second selection region displays the plurality of seconds of a minute in a selectable second cell and the year selection region displays the plurality of years in a selectable year cell.

In an example embodiment, the scheduler 208 may be configured to receive one or more schedule selection inputs from the user 204. The schedule selection inputs specify a selection of one or more cells in one or more of the plurality of regions of the GUI 312. The selection of the one or more cells defines the schedule for the recurring task. Accordingly, on receiving the schedule selection inputs, the scheduler 208 may be configured to create the recurring task.

In an example, the scheduler 208 may be configured to receive a command input from the user 204 that specifies the application to be executed as a part of a command. Accordingly, the scheduler 208 creates a task function based on the defined schedule and the command. Herein, the task function is to execute the command recurrently based on the schedule. In an example, the task function may be a CRON expression, where the schedule for the recurring task is defined.

Once the task function is created, the task function may execute the command recurrently based on the schedule. Accordingly, the processor 302 may be configured to execute the application in the electronic device 202 at a time corresponding to the schedule for the recurring task.

In an example embodiment, one or more of the selection regions 314-320 may include a wildcard cell. Herein, selection of the wildcard cell specifies the selection of all the cells in the corresponding one or more of selection regions 314-320. In an example, the wildcard cells are depicted by 322-1 to 322-3 in the figure. Herein, 322-1 corresponds to every month cell, 322-2 corresponds to every day of the month, and 322-3 corresponds to every day of the week.

In an example embodiment, the first view of the GUI 312 may further include a schedule description region 324. The schedule description region 324 provides a written description of the schedule based upon the selection of one or more cells by the user 204.

In an example embodiment, the first view of the GUI 312 may further include a schedule period region 326. In an example, the schedule period region 326 may include a schedule start date entry and a schedule end date entry using which the user 204 may specify a start of a period and an end of the period, respectively. Herein, the period defines when the recurring task is scheduled. In other words, from which date to which date, the task is scheduled.

In an example embodiment, the GUI 312 may further include an advanced option 328. On selecting the advanced option, the user 204 may be presented with a second view (not shown in the figure). In the second view, the GUI 312 may include an advanced region in which the user can specify or define the schedule for the recurring task based on a number of days from the end of the month, a last weekday of the month, a specific day of a specific week, and a nearest weekday to a specific day.

Figure 4:
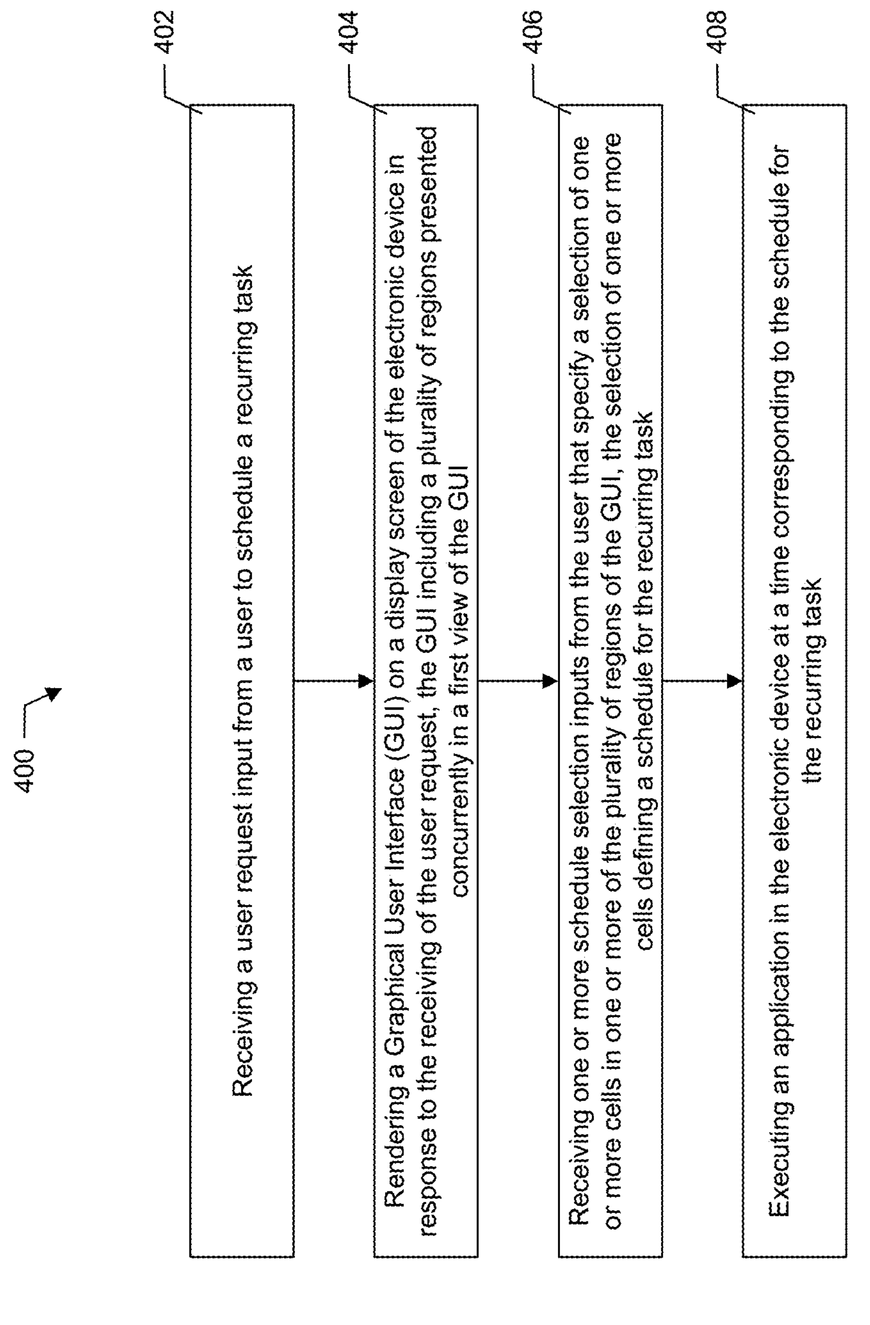
FIG. 4 illustrates a flowchart of a method of scheduling recurring tasks using an electronic device, according to an example embodiment of the present subject matter.

FIG. 4 illustrates a flowchart of a method 400 of scheduling recurring tasks using an electronic device, according to an embodiment of the present subject matter. For the sake of brevity details of steps that are already described above in reference to FIG. 2 and FIG. 3 are not provided in detail herein. In an example, the method 400 may be implemented by an electronic device, such as the electronic device 202.

At step 402, a user request from a user to schedule a recurring task is received. In an example, the recurring task may be set on an electronic device, such as the electronic device 202. In an example, the scheduler 208 may be configured to receive the user request.

At step 404, a GUI is rendered on a display screen of the electronic device in response to the receiving of the user request. In an example, the scheduler 208 may render the GUI on the display 310. In an example, the GUI includes a plurality of region that are presented concurrently in a first view of the GUI. In an example, the plurality of regions includes, a month selection region, a date selection region, a day selection region, and a time selection region as described above. In an example, the plurality of regions may further include a second selection region and a year selection region.

In an example embodiment, one or more of the selection regions each comprises a wildcard cell, wherein selection of the wildcard cell specifies selection of all the cells in the corresponding one or more selection regions.

In an example embodiment, the date selection region, the day selection region, and the month selection region non obtrusively with respect to each other in one of a vertically and horizontal alignment, in the first view of the GUI.

In an example embodiment, the first view of the GUI further comprises a schedule period region, wherein the user specifies a start of a period and an end of the period, the period defining when the recurring task is scheduled.

In an example embodiment, the time selection region comprises a minute selection region. The minute selection region comprises the plurality of minute cells corresponding to the plurality of minutes, such that one or more frequently used minute cells have a selectable area that is greater than a selectable area of other minute cells present in the plurality of minute cells. Accordingly, such more frequently used cells may be easily identified and selected.

In an example embodiment, a length of the time selection region is equal to a sum of lengths of the date selection region, the day selection region, and the month selection region. Furthermore, in an example embodiment, each of the date selection region, the day selection region, and the month selection region have same breadth.

In an example embodiment, the GUI may include an advanced region, where the user can specify the schedule for the recurring task by: (a) a number of days from the end of a month; (b) a last weekday of the month; (c) a specific day of a specific week; (d) or a nearest weekday to a specific day.

At step 406, one or more schedule selection inputs from the user that specify a selection of one or more cells in one or more of the plurality of regions of the GUI are received. The selection of the one or more cells defines a schedule for the recurring task. In an example, the scheduler 208 may receive the one or more schedule selection inputs.

In an example embodiment, the first view of the GUI further comprises a schedule description region that provides a written description of the schedule based upon the selection of one or more cells by the user.

At step 408, an application in the electronic device at a time corresponding to the schedule for the recurring task is executed. In an example, the processor 302 may execute the application in the electronic device 202.

In an example embodiment, a command input from the user specifying the application to be executed as part of a command may be received. The method further includes, creating a task function based on the defined schedule and the command, wherein the task function is to execute the command recurrently based on the schedule. In an example, the task function may a CRON expression that includes a definition of the schedule.

Thus, according to the aspects of the present subject matter, the systems and methods disclosed herein provide at least for the following advantages:

Rich user experience for building CRON expression with all features using innovative compact design.

User can view the complete schedule Interface in a single view.

User does not need to switch between multiple tabs or other selection controls (radio buttons or combos etc.) to see complete schedule.

Compact compared to other user interfaces with close to similar functionality.

Innovative Clock dial arrangement which allows to select hours and minutes in a single view. Ability to see 12 hr. or 24 hr. format within the same view It has only two views; basic and advanced. Any schedule combination can be represented in one of the views. No schedule combination spans across two views. Only one view is required to represent complete schedule.

Figure 5A:
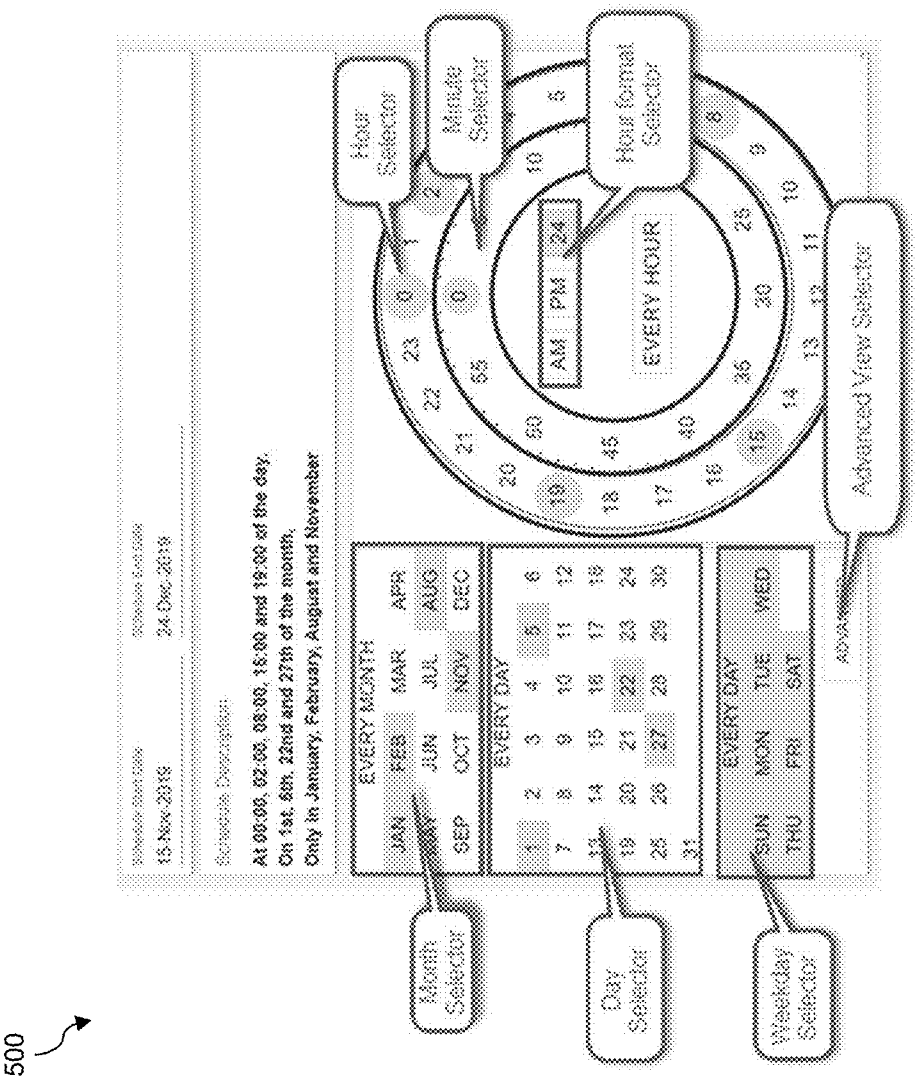
FIG. 5A illustrates a use case according to example embodiments of the present subject matter.
Figure 5B:
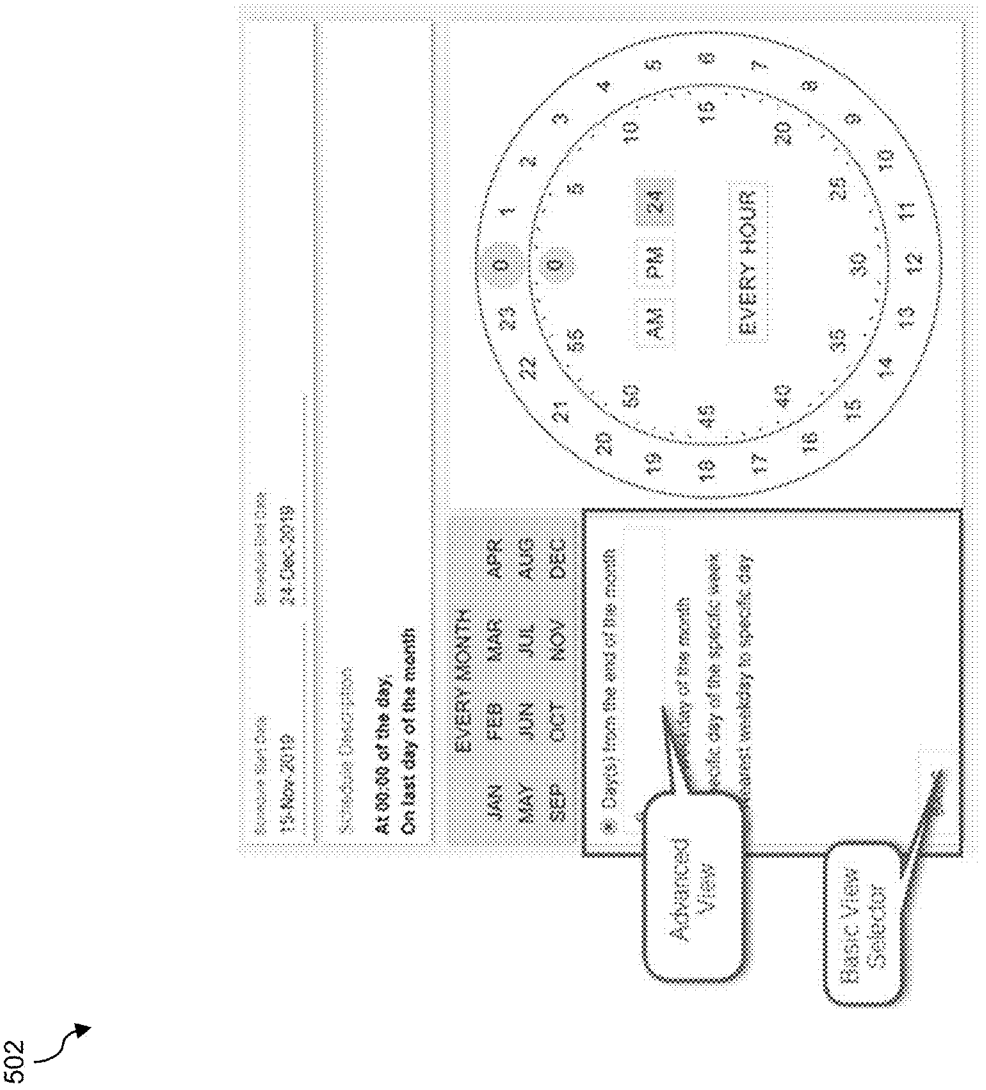
FIG. 5B illustrates the use case of FIG. 5A according to example embodiments of the present subject matter.

FIGS. 5A and 5B illustrates an UI 500 and an UI 502, respectively, according to aspects of the present subject matter. As may be seen in the FIG. 5(*a*), the UI 500 represents a basic User Interface (UI) (sometimes referred to as a GUI) provided by the scheduler. The UI 500 includes a month selector, a day selector, a weekday selector, an advanced view selector, an hour selector, a minute selector, and an hour format selector. Further referring to the UI 500, as may be seen, an event has been scheduled which would be performed at 00:00, 02:00, 08:00, 15:00, and 19:00 hour on 1st, 5th, 22nd, and 27th day of January, February, August, and September. As may be seen, the user is provided with option to set this recurring schedule event using a first view of a single UI, i.e., the UI 500. As all the parameter values are provided on a single interface itself, no multiple tabs are provided. As may be seen, the advanced view provides for one or more conditions that may be selected or defined by the user. Accordingly, the scheduled event may be modified or created.

Figure 6:
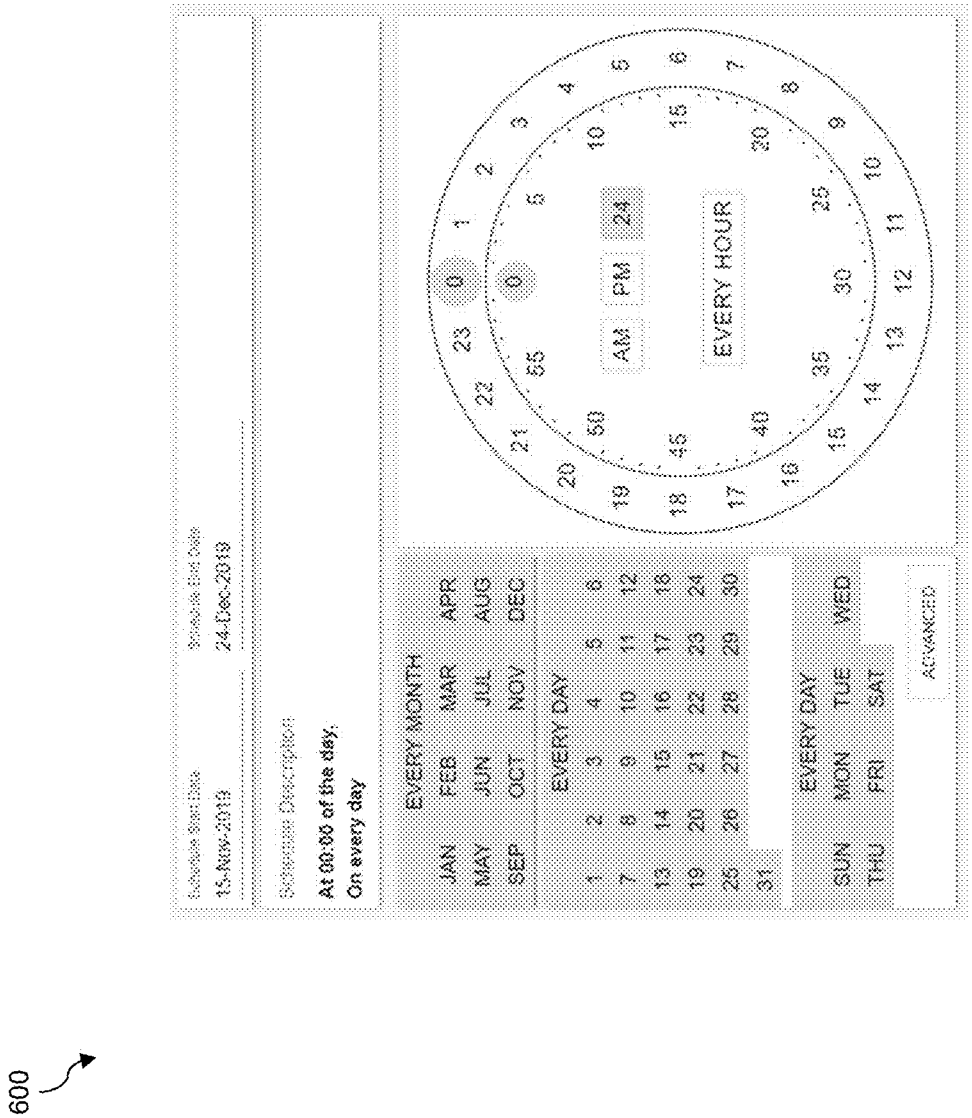
FIG. 6 illustrates another use case according to example embodiments of the present subject matter.

FIG. 6 illustrates a UI 600, according to an example use case performed in accordance with the aspects of the present subject matter. As is shown, a user may schedule an event to be performed at 00:00 hour on every day of the month, through a first view of the UI 600.

Figure 7:
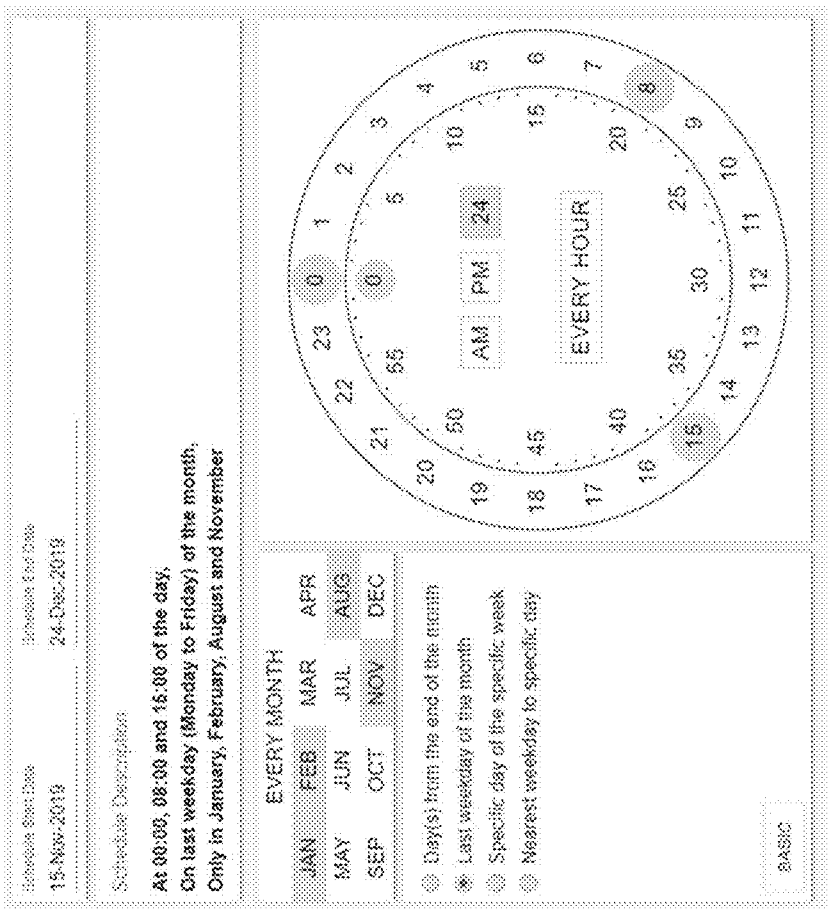
FIG. 7 illustrates another use case according to example embodiments of the present subject matter.

FIG. 7 illustrates a UI 700, according to an example use case performed in accordance with the aspects of the present subject matter. As is shown, a user may use the advanced feature of the UI 202 and may set a schedule for 00:00, 08:00, and 15:00 hour, at last weekday for the months of January, February, August, and November, through a first view of the UI 700.

Figure 8:
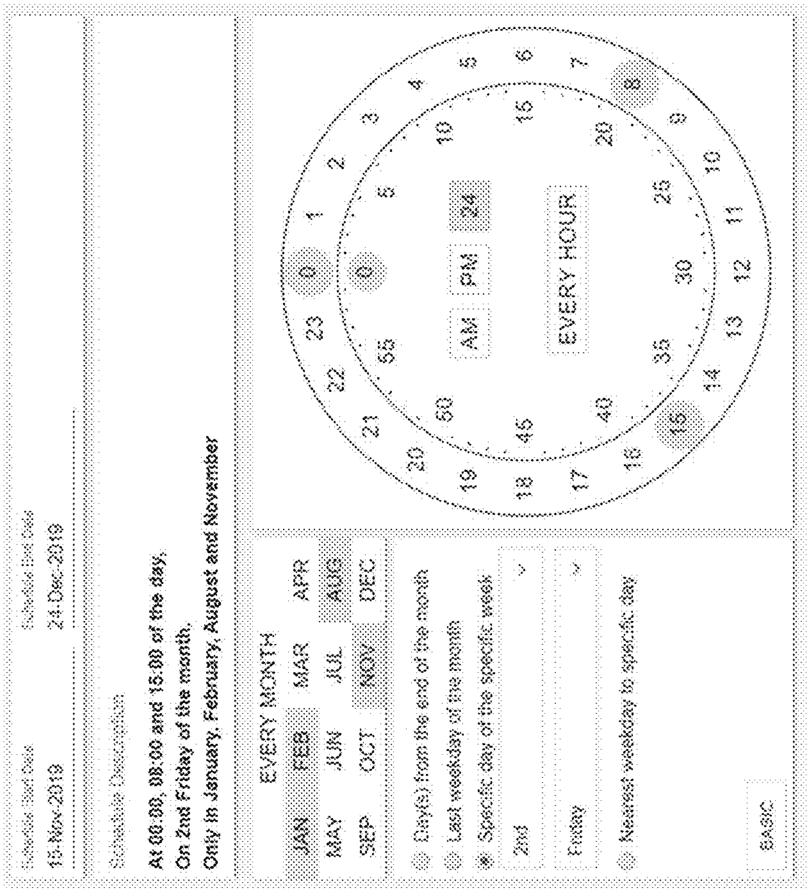
FIG. 8 illustrates another use case according to example embodiments of the present subject matter.

FIG. 8 illustrates a UI 800, according to an example use case performed in accordance with the aspects of the present subject matter. As is shown, a user may set the schedule for 00:00, 08:00, and 15:00 hour, for second Friday of the month, for the months of January, February, August, and November, through a first view of the UI 800.

Figure 9:
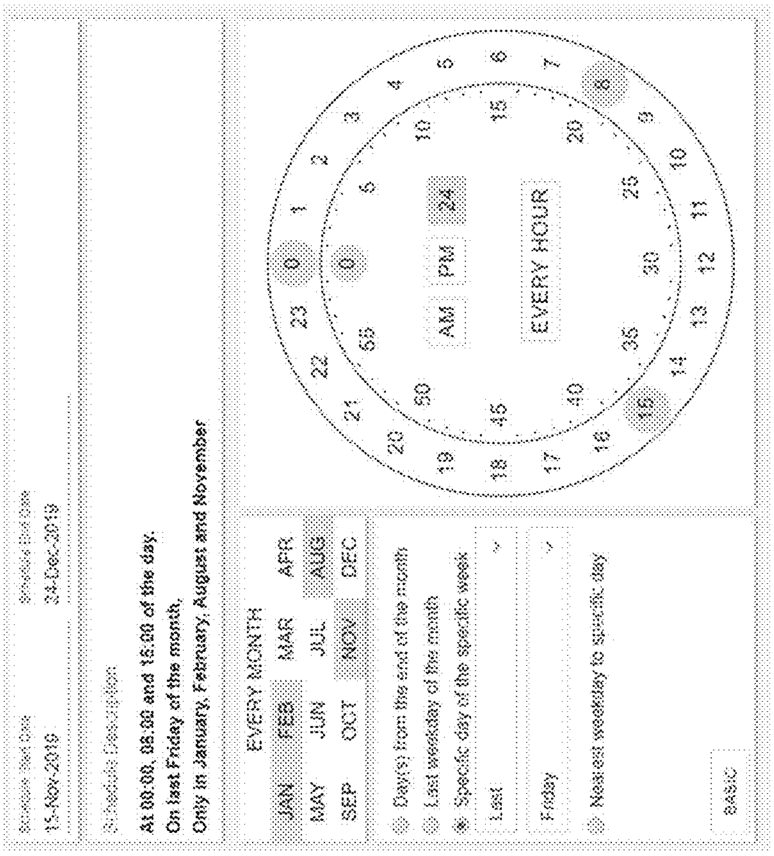
FIG. 9 illustrates another use case according to example embodiments of the present subject matter.

FIG. 9 illustrates a UI 900, according to an example use case performed in accordance with the aspects of the present subject matter. As is shown, a user may set the schedule for 00:00, 08:00, and 15:00 hour, for last Friday of the month, for the months of January, February, August, and November, through a first view of the UI 900.

Figure 10:
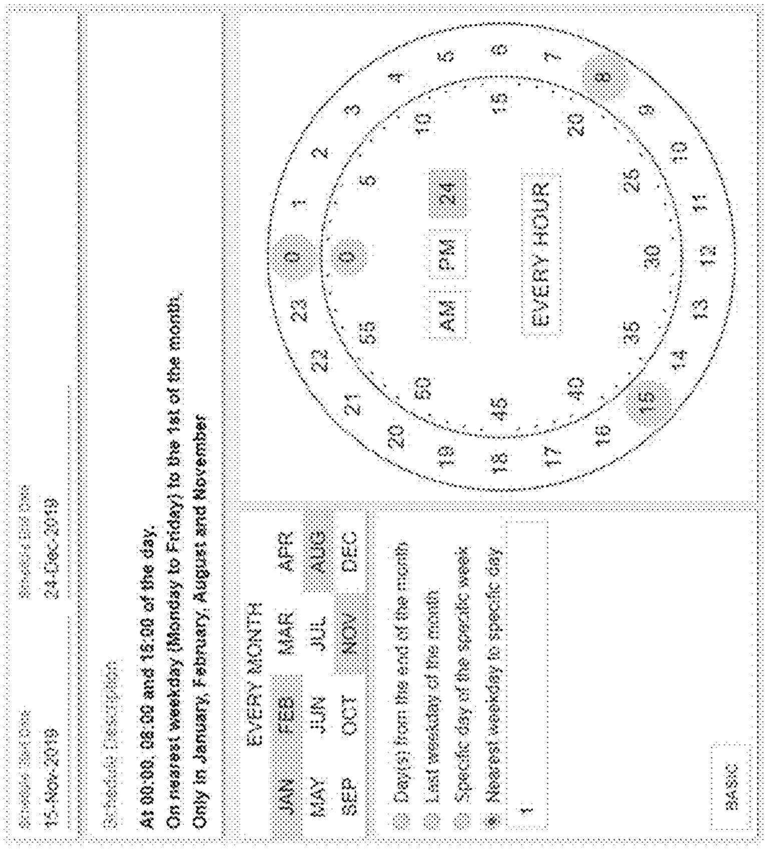
FIG. 10 illustrates another use case according to example embodiments of the present subject matter.

FIG. 10 illustrates a UI 1000, according to an example use case performed in accordance with the aspects of the present subject matter. As is shown, using the advanced feature of the UI 700, a user may schedule an event for 00:00, 08:00, and 15:00 hour, for nearest weekday for a specified day, for the months of January, February, August, and November, through a first view of the UI 1000.

Figure 11:
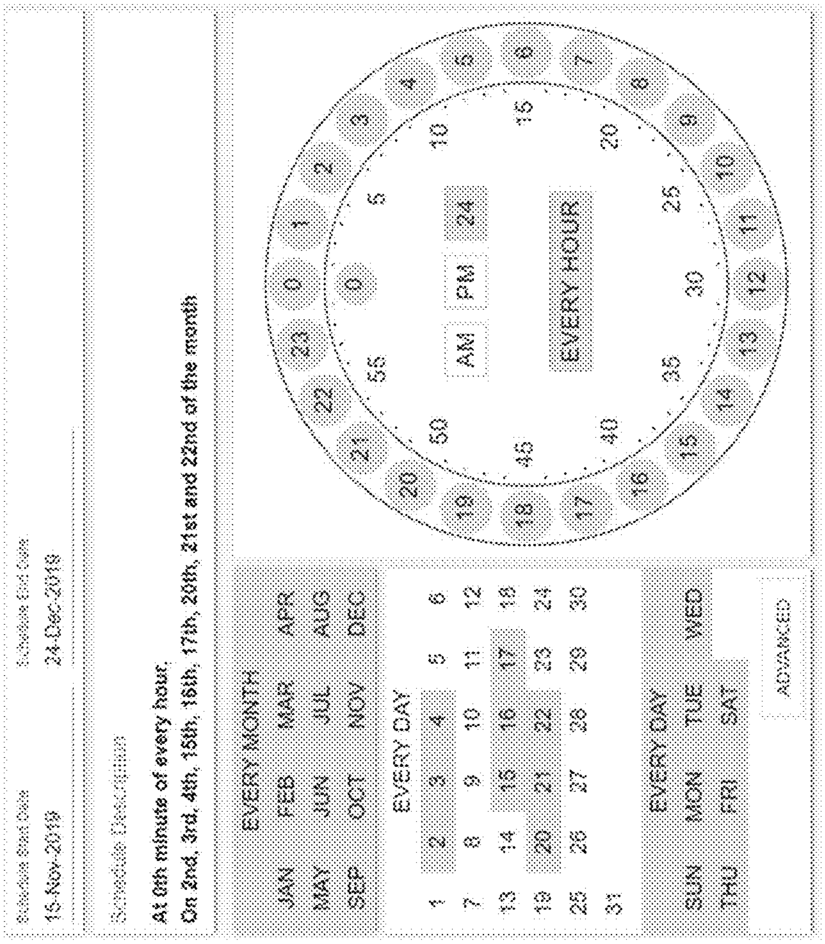
FIG. 11 illustrates another use case according to example embodiments of the present subject matter.

FIG. 11 illustrates a UI 1100, according to an example use case performed in accordance with the aspects of the present subject matter. As is shown, a user may schedule an event for 00:00 minute for every hour, for 2nd, 3rd, 4th, 15th, 16th, 17th, 20th, 21st, and 22nd of a given month, through a first view of the UI 100, through a first view of the UI 1100.

Figure 12:
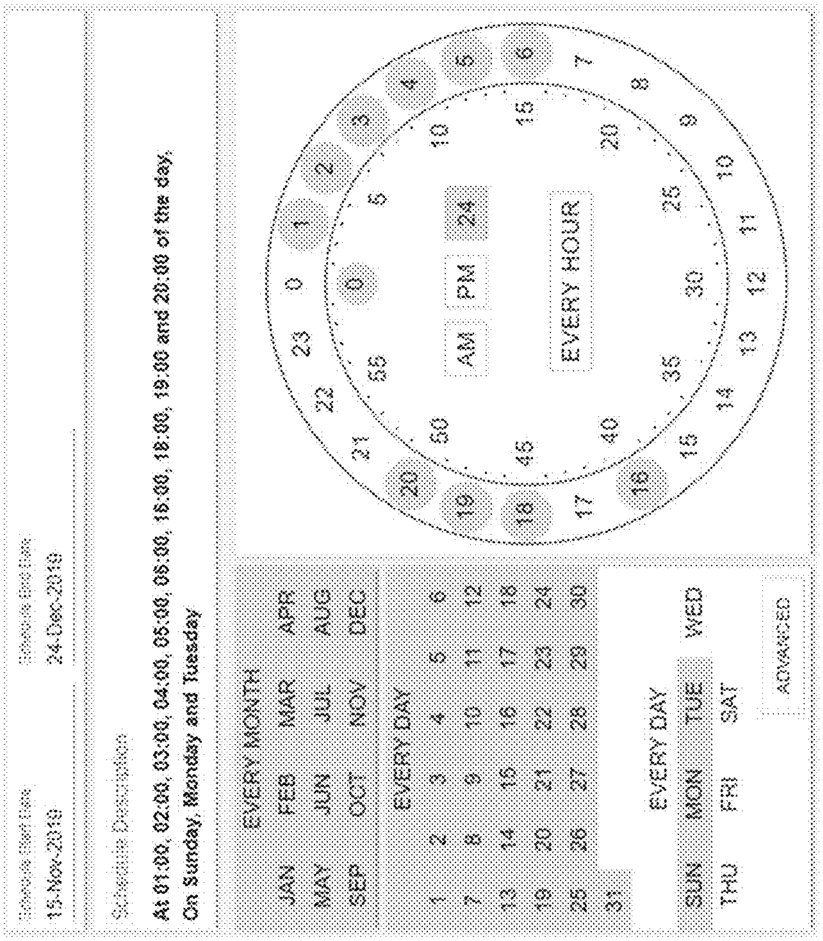
FIG. 12 illustrates another use case according to example embodiments of the present subject matter.

FIG. 12 illustrates a UI 1200, according to an example use case performed in accordance with the aspects of the present subject matter. As is shown, a user may schedule an event for 01:00 to 06:00 and 16, 18:00 to 20:00 hours for Sunday, Monday, and Tuesday, through a first view of the UI 1200.

Figure 13A:
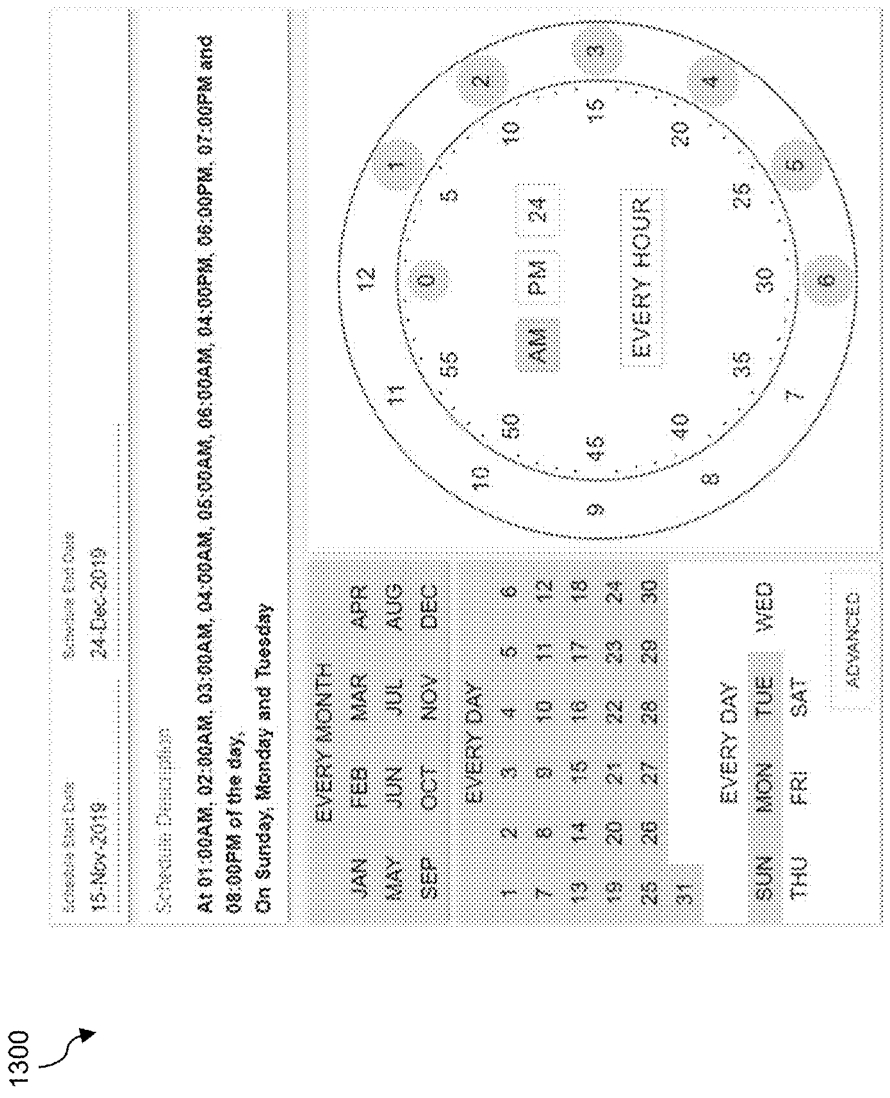
FIG. 13A illustrates another use case according to example embodiments of the present subject matter.
Figure 13B:
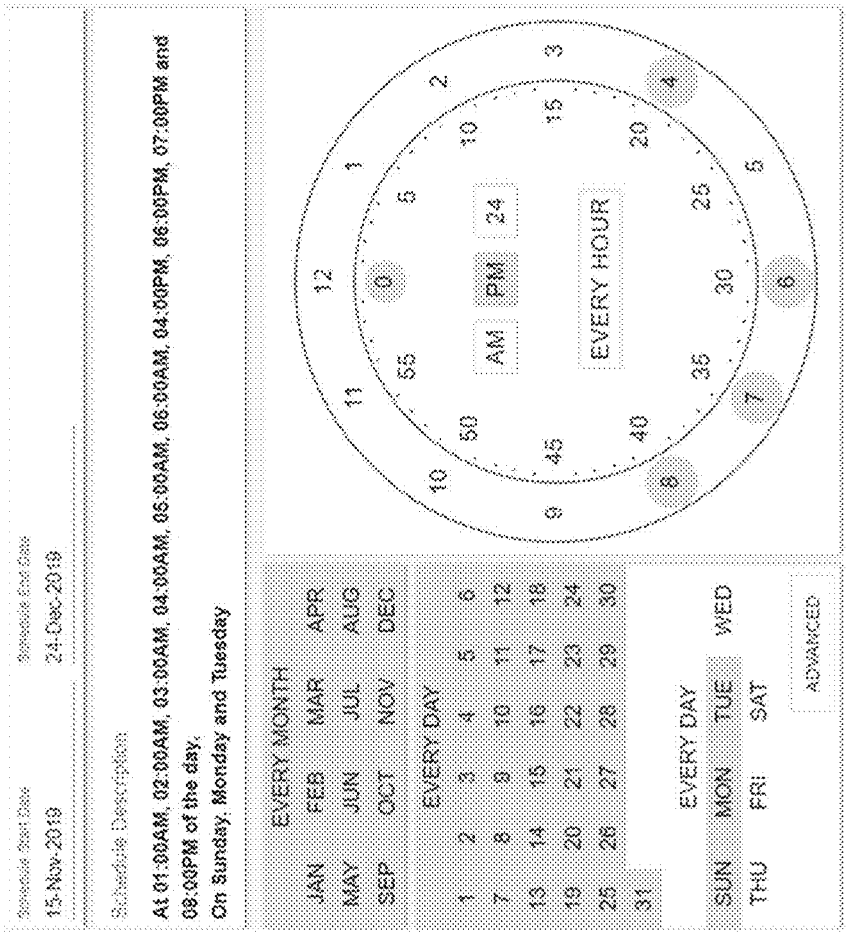
FIG. 13B illustrates the user case of FIG. 13A according to example embodiments of the present subject matter.

FIGS. 13A and 13B illustrate a UI 1300, according to an example use case performed in accordance with the aspects of the present subject matter. As is shown, a user may set a schedule for 00:00 to 06:00 AM and 04:00 to 08:00 PM of the day, for Sunday Monday, and Tuesday, through a first view of the UI 1300.

FIG. 14 illustrates a UI 1400, according to an example use case performed in accordance with the aspects of the present subject matter. As is shown, in an example embodiment, the UI 1400 may include a second selection region 1402 and a year selection region 1404. In an example, the second selection region 1402 displays the plurality of seconds of a minute in a selectable second cell and the year selection region 1404 displays the plurality of years in a selectable year cell, in a first view of the UI 1400.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A system configured for scheduling recurring tasks using an electronic device, the system comprising:

a processor;

a memory coupled to the processor; and a scheduler coupled to the processor, wherein the scheduler is configured to:

receive a user request from a user to schedule a recurring task, render a Graphical User Interface (GUI) on a display screen of the electronic device in response to the receiving of the user request, the GUI configured to concurrently display on a same screen for user selection:

all months of a calendar year, each of the months an independently selectable and user-selectable month cell, all dates of a month, each of the dates an independently selectable and user-selectable date cell, all days of a week, each of the days an independently selectable and user-selectable weekday cell, all hours of a day, each of the hours an independently and user-selectable selectable hour cell, and all minutes of an hour, each of the minutes an independently selectable and user-selectable minute cell, wherein a display size of one or more of the minutes in the hour is different than a display size of other minutes in the hour, receive a plurality of cell selections, each cell selection corresponding to a single independently selectable cell of a plurality of independently selectable cells, the plurality of independently selectable cells including the independently selectable month cells and the independently selectable date cells, the plurality of cell selections corresponding to at least one of: two or more independently selectable month cells, or two or more independently selectable date cells, and define a schedule for the recurring task using the plurality of cell selections, wherein the processor is configured to execute an application in the electronic device at a time corresponding to the schedule for the recurring task.

2. The system as claimed in claim 1, wherein the scheduler is further configured to:

receive command input from the user specifying the application to be executed as part of a command; and create a task function based on the defined schedule and the command, wherein the task function is to execute the command recurrently based on the schedule.

3. The system as claimed in claim 1, wherein the GUI is also configured to concurrently display:

a plurality of seconds of a minute in a selectable second cell; and a plurality of years in a selectable year cell.

4. The system as claimed in claim 1, wherein the scheduler is further configured to render the GUI such that a date selection region, a day selection region, and a month selection region are displayed non-obtrusively with respect to each other in one of a vertically and horizontal alignment.

5. The system as claimed in claim 1, wherein a length of a time selection region of the GUI is equal to a sum of lengths of a date selection region, a day selection region, and a month selection region.

6. The system as claimed in claim 1, wherein the GUI includes each of a date selection region, a day selection region, and a month selection region having the same breadth.

7. The system as claimed in claim 1, wherein the scheduler is configured to define schedule for the recurring task using a CRON expression.

8. A method of scheduling recurring tasks using an electronic device, the method comprising:

receiving, by a scheduler, a user request from a user to schedule a recurring task;

rendering, by the scheduler, a Graphical User Interface (GUI) on a display screen of the electronic device in response to the receiving of the user request, the GUI configured to concurrently display on a same screen for user selection:

all months of a calendar year, each of the months an independently selectable and user-selectable month cell;

all dates of a month, each of the dates an independently selectable and user-selectable date cell;

all days of a week, each of the days an independently selectable and user-selectable weekday cell; and all hours of a day, each of the hours an independently selectable and user-selectable hour cell, and all minutes of an hour, each of the minutes an independently selectable and user-selectable minute cell, wherein a display size of one or more of the minutes in the hour is different than a display size of other minutes in the hour;

receiving a plurality of cell selections, each cell selection corresponding to a single independently selectable cell of a plurality of independently selectable cells, the plurality of independently selectable cells including the independently selectable month cells and the independently selectable date cells, the plurality of cell selections corresponding to at least one of: two or more independently selectable month cells, or two or more independently selectable date cells; and defining a schedule for the recurring task using the plurality of cell selections; and executing, by a processor, an application in the electronic device at a time corresponding to the schedule for the recurring task.

9. The method as claimed in claim 8, further comprising:

receiving command input from the user specifying the application to be executed as part of a command; and creating a task function based on the defined schedule and the command, wherein the task function is to execute the command recurrently based on the schedule.

10. The method as claimed in claim 8, wherein the GUI is also configured to concurrently display:

a plurality of seconds of a minute in a selectable second cell; and a plurality of years in a selectable year cell.

11. The method as claimed in claim 8, wherein the GUI comprises one or more selection regions each comprising a wildcard cell, wherein selection of the wildcard cell specifies selection of all the cells in the corresponding one or more selection regions.

12. The method as claimed in claim 8, wherein the GUI further comprises a schedule description region that provides a written description of the schedule based upon the selection of the plurality of cell selections.

13. The method as claimed in claim 8, comprising displaying a date selection region, a day selection region, and a month selection region non obtrusively with respect to each other in one of a vertically and horizontal alignment.

14. The method as claimed in claim 8, wherein the GUI further comprises a schedule period region, wherein the user specifies a start of a period and an end of the period, the period defining when the recurring task is scheduled.

15. The method as claimed in claim 8, wherein a time selection region of the GUI comprises a minute selection region, wherein the minute selection region comprises the independently selectable minute cells corresponding to the plurality of minutes, wherein one or more frequently used independently selectable minute cells have a first selectable area that is greater than a second selectable area of other independently selectable minute cells present in the independently selectable minute cells.

16. The method as claimed in claim 8, wherein a length of a time selection region of the GUI is equal to a sum of lengths of a date selection region of the GUI, a day selection region of the GUI, and a month selection region of the GUI.

17. The method as claimed in claim 8, wherein the GUI comprises each of a date selection region, a day selection region, and a month selection region having the same breadth.

18. The method as claimed in claim 8, wherein the GUI further comprises an advanced region, wherein the user can specify the schedule for the recurring task by: (a) a number of days from the end of each month corresponding to the selected independently selectable month cells; (b) a last weekday for each month corresponding to the selected independently selectable month cells; or (c) a nearest weekday to a specific day for each month corresponding to the selected independently selectable month cells.

19. The method as claimed in claim 8, wherein the schedule for the recurring task is defined by a CRON expression.

20. A non-transitory computer-readable medium comprising computer code, wherein the computer code of the computer-readable medium is executable by a processor to perform a method comprising:

receiving a user request from a user to schedule a recurring task;

rendering a Graphical User Interface (GUI) on a display screen of an electronic device in response to the receiving of the user request, the GUI configured to concurrently display on a same screen for user selection:

all months of a calendar year, each of the months an independently selectable and user-selectable month cell;

all dates of a month, each of the dates an independently selectable and user-selectable date cell;

all days of a week, each of the days an independently selectable and user-selectable weekday cell; and all hours of a day, each of the hours an independently selectable and user-selectable hour cell, and all minutes of an hour, each of the minutes an independently selectable and user-selectable minute cell, wherein a display size of one or more of the minutes in the hour is different than a display size of other minutes in the hour;

receiving a plurality of cell selections, each cell selection corresponding to a single independently selectable cell of a plurality of independently selectable cells, the plurality of independently selectable cells including the independently selectable month cells and the independently selectable date cells, the plurality of cell selections corresponding to at least one of: three or more independently selectable month cells separated by at least two nonequal time gaps, or three or more independently selectable date cells separated by at least two nonequal time gaps; and defining a schedule for the recurring task using the plurality of cell selections; and executing an application in the electronic device at a time corresponding to the schedule for the recurring task.

21. The system as claimed in claim 1, wherein the plurality of cell selections includes at least one independently selectable month cell, two or more independently selectable date cells, at least one independently selectable hour cell, and at least one independently selectable minute cell.

22. The system as claimed in claim 21, wherein the schedule includes at least two non-consecutive days of a given week, and wherein the plurality of selections does not include the independently selectable weekday cells.

* * * * *